April 28, 1931. E. A. NELSON 1,802,773
WHEEL
Filed Oct. 28, 1926 3 Sheets-Sheet 2
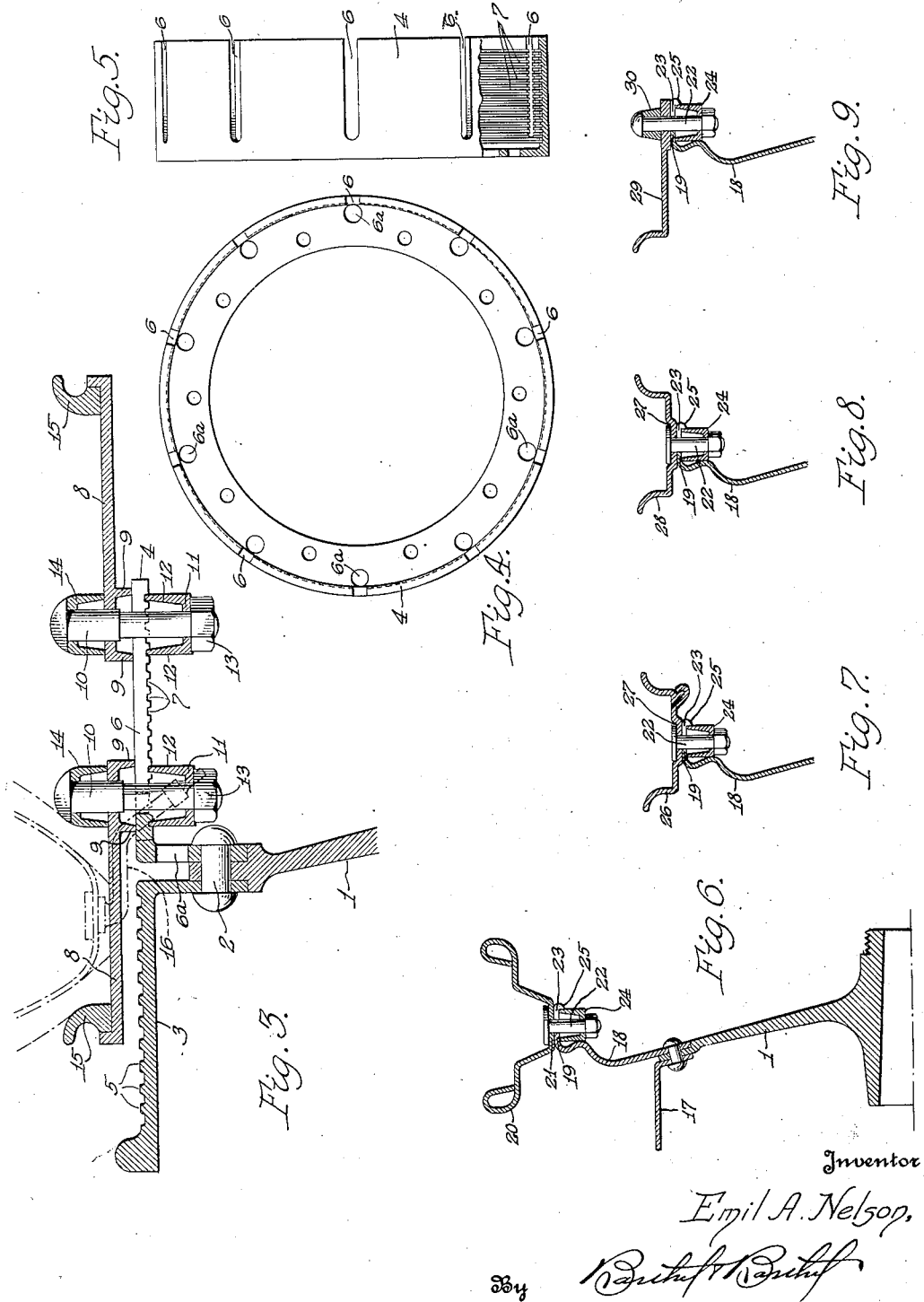

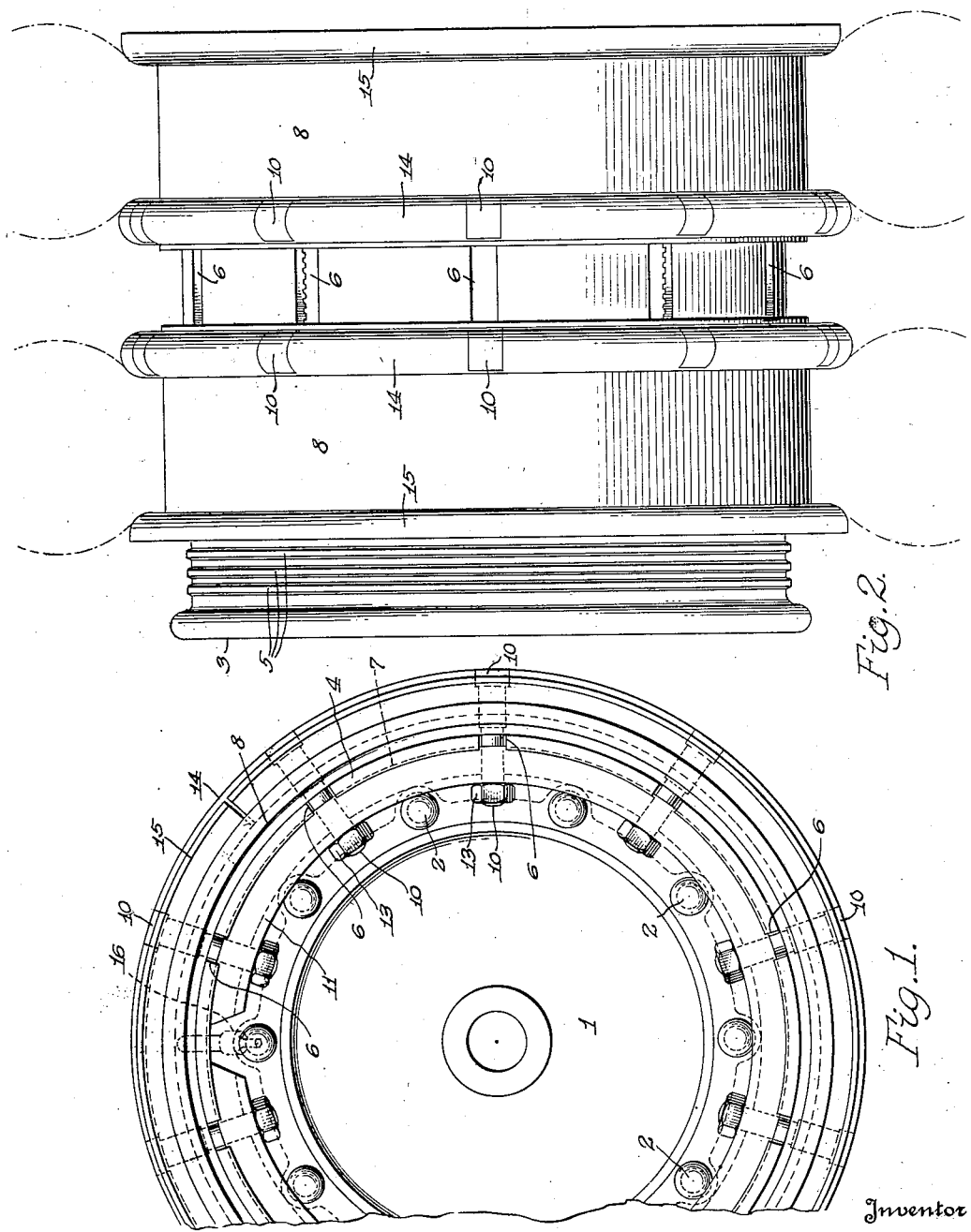

Inventor
Emil A. Nelson,
By
Attorneys

Patented Apr. 28, 1931

1,802,773

UNITED STATES PATENT OFFICE

EMIL A. NELSON, OF DETROIT, MICHIGAN

WHEEL

Application filed October 28, 1926. Serial No. 144,692.

In the mounting of detachable rims upon motor vehicle wheels, it is the usual practice to mount in "spots" that is a series of wedge members are inserted between rim and wheel to expand the rim and crowd it laterally against a shoulder on the wheel. In this type of mounting, the rim is liable to be forced out of round and care must be exercised in mounting. The present invention aims to provide a mounting wherein the rim is held in true concentric relation to wheel axis and firmly seated throughout its entire circumference, and the peripheral portion of the wheel is strengthened and stiffened.

It is common to provide wheels designed for heavy loads, with dual tires, but the rims for holding such tires while being detachable, have a fixed position upon the wheel which position may not be changed to bring them into proper relation to the load plane of the wheel or to provide for tires of different cross sectional shapes or diameters. It is an object of the present construction to provide for the mounting of rims of different widths or shapes upon the same wheel and for lateral and relative adjustment of such rims thereon, whereby tires of different character or cross-sectional diameter may be employed and the position of such tires adjusted relative to each other.

A further object is to provide a mounting particularly adapted for heavy duty wheels wherein the rim or rims may be mounted or removed with facility and a secure fastening and rigid support afforded therefor.

With the above and other ends in view, the invention consists in providing an annular peripheral seat on the wheel for a rim, together with means for seating and contracting the rim upon said seat and strengthening and stiffening the seat part. The invention further consists in providing an arrangement whereby the position of the rim or rims relative to the wheel load plane or relative to each other may be adjusted laterally of the wheel, and in providing a construction and arrangement of parts having certain other new and useful features, all as hereinafter more fully described and more particularly pointed out in the appended claims, reference being had to the accompanying drawings in which Figure 1 is a side elevation of a wheel illustrative of the present invention, with portions broken away to shorten the figure;

Fig. 2 is a plan view showing rims in place thereon and in elevation;

Fig. 3 is a sectional detail showing the outer portion of the wheel with rims in place thereon and in transverse section;

Fig. 4 is a side elevation of an annular supporting flange;

Fig. 5 is an edge elevation of said annular flange;

Fig. 6 is a sectional detail illustrating a modified form of wheel embodying features of the invention;

Figure 10:
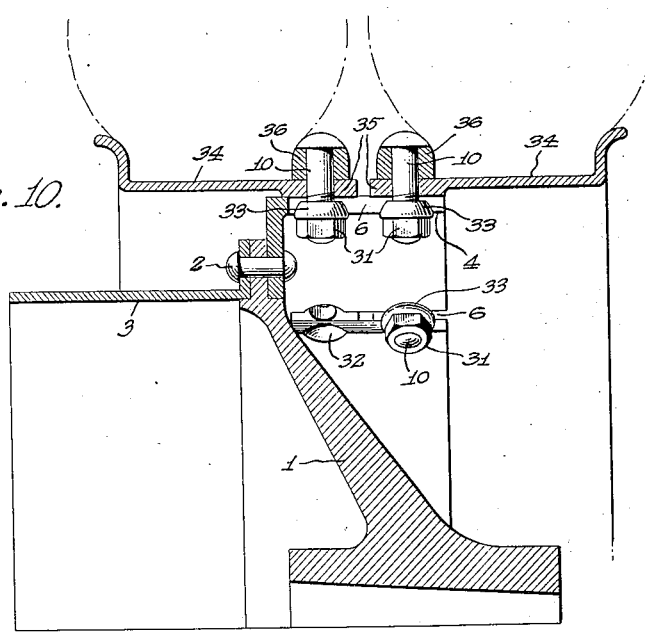
Figure 11:
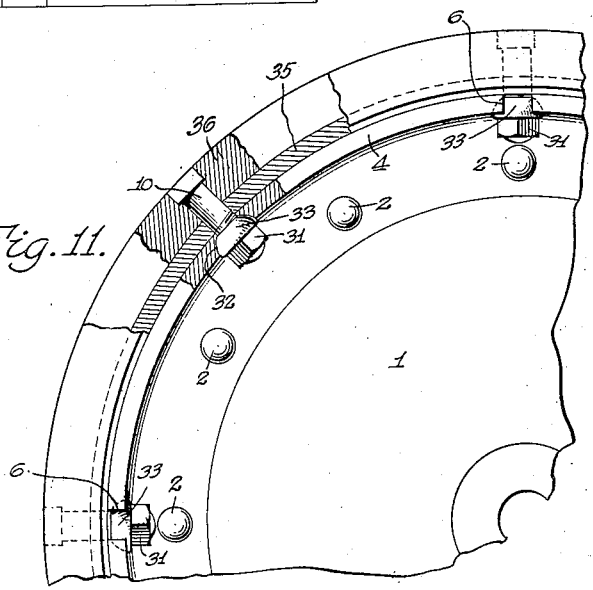
Figure 12:
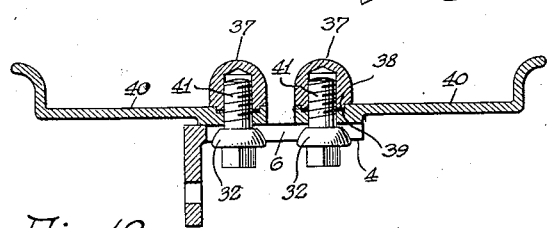

Figs. 7, 8, and 9 are sectional details showing the application of the present rim mounting to various forms of rim constructions;

Figs. 10 and 11 are sectional details showing the mounting in transverse section and side elevation with parts in section, respectively; and Fig. 12 is a sectional detail similar to Fig. 10 showing a modified form of rim side ring and modification in the manner of holding this ring and rim in place.

As shown in Figs. 1, 2 and 3, the numeral 1 indicates the disk or web portion of a wheel and to a peripheral portion of this disk is secured by rivets 2, a brake drum flange 3 extending laterally in one direction from the disk, and an annular supporting member or flange 4 extending laterally from the disk in an opposite direction. The brake drum flange is preferably externally ribbed as at 5 to provide for rapid radiation of heat generated by the frictional engagement of a braking member (not shown) adapted to engage the inner surface of the flange 3, and the supporting flange 4 is formed with openings 6ª for the free circulation of air beneath a rim mounted thereon and with slots 6 extending transversely thereof, inwardly from the free edge of the flange, said flange being also formed upon its inner surface with annular ribs providing between these ribs, a series of grooves 7. Two like tire carrying rims 8 are shown as mounted upon said supporting flange, each rim having a channel formation along one side edge, which channel provides spaced apart ribs 9 on the inner surface of each rim adjacent a side edge thereof to seat upon the outer surface of the annular supporting flange 4 and hold the rim spaced from said supporting and drum flanges with the edges of the ribs 9 firmly seated upon said flange 4 and drawn into contact therewith by a series of bolts 10 which extend radially inward of the wheel through openings in each rim located between said ribs 9 and through the slots 6 in the supporting flange 4, said flange being clamped by said bolts firmly between said rim 8 and an inner split channel shaped ring 11 placed within the annular supporting flange with the edges of the side flanges 12 of the ring 11 engaging the grooves 7 in the inner surface of the supporting flange, said bolts 10 passing inward through openings in said split channel ring 11 with nuts 13 applied to their inner ends, whereby the rims 8 are drawn into firm seating contact upon the outer side of the flange 4 with said flange firmly clamped between the rim or rims and the split ring or rings 11 with the side flanges of the inner split ring or rings engaged with the grooves 7 to firmly hold both rim and split ring in place. The feature of clamping the wheel flange between the rim and the expansible ring is included in the subject matter of an application for Letters Patent of the United States which is a division of the present application, said application having been filed on the 5th day of August, 1927, and serially numbered 210,788. Because of the plurality of grooves 7 which are provided in the inner face of the supporting flange 4, either or both rims 8 may be readily adjusted laterally of the wheel or relative to each other, to change the position of either or both rims relative to the wheel hub bearings (not shown) and load plane of the wheel. This adjustment also provides for the mounting of tires of different cross-sectional areas or shapes upon the rims as such tires may require being mounted closer together or farther apart. This adjustment also permits of the mounting of a single rim and tire and the bringing of such tire into proper relation to the load plane and gauge of vehicle tread by such adjustment. As the rims 8 are identical in form, they are interchangeable and may be mounted upon the supporting flange with either edge outwardly thereby bringing the overhanging portion of the rim at either side of its place of attachment and support, each rim being secured in place and supported along a side edge portion thereof by the ribs 9 which also serve to strengthen and stiffen the rim.

The bolt 10 as shown may also serve to secure a tire holding side ring 14 in place upon each rim 8. These side rings 14 are also preferably of channel-shape in cross-section with the free edges of the flanges of the channel seating upon the upper surface of its rim 8 to provide a good seat thereon, the bolts passing outward through openings in the bottom or outer wall of the channel and being provided with heads to seat upon the ring. These bolts therefore not only serve the purpose of securely and detachably holding each rim in place upon its support and the supporting flange clamped between rim and split ring 11, but also to detachably secure a side ring 14 firmly in place upon the rim to which they are applied. The opposite side tire retaining ring 15 for each rim may be a detachable split ring as shown, or may be an integral part of the rim or of any other form to suit the kind of tire employed. As shown in dotted lines in Fig. 3, where a pneumatic tire is used, the rim may be provided with an opening for the valve stem 16 which will be bent laterally and then inwardly to extend between the adjacent ends of the split clamping rings 11 as shown in Fig. 1.

As illustrative of the application of the present invention to a vehicle wheel designed for comparatively light loads, such as pleasure cars and the like, a construction is shown in Fig. 6 wherein the web 1 may be of any suitable form or construction and the brake drum flange 17 is secured thereto to extend laterally therefrom in one direction and a member 18, preferably of sheet metal, is attached to the opposite side of the peripheral portion of the web to form a continuation outwardly of this web and is bent laterally or dished with its outer peripheral portion turned horizontally to provide a substantially flat seating-flange portion 19 to receive the rim 20 which seats directly thereon throughout the width of this flange. This rim 20 may have any desired cross-sectional configuration, the rim shown in Fig. 6 being of the drop center type wherein the bottom wall or base of the rim is formed with a longitudinal continuous annular channel, the bottom wall 21 of which channel is adapted to seat upon the flange portion 19 of the part 18 of the wheel web. The rim is detachably secured in place by means of bolts 22 each having a flat head to seat in the bottom of the channel with the bolt passing radially inward through openings in the bottom 21 of the channel and through slots 23 cut inward from the free edge of the seat flange 19 and through a split ring 24 similar to the ring 11, which split ring is thus drawn into contact with the inner side of the flange 21 to strengthen the same and clamp it firmly between said ring and the rim 20. The free edge portion of the slotted supporting flange 19 is turned laterally inward to form an annular rib 25 adapted to engage one side of the split ring and hold the same against coming off laterally when the nuts on the bolts are turned up, said rib also preventing lateral movement of the rim on its seat in one direction and the engagement of the ring at its opposite side with the member 18 or continuation of the web wall, preventing lateral movement of the rim and ring in the opposite direction. The rim thus has a continuous seat upon a supporting flange extending laterally from the wheel web and the bolts serve to detachably secure it in place and to contract it into firm seating contact thereon. The split ring 24 strengthens the slotted supporting flange and clamps it firmly between rim and ring, and also provides for the ready demounting of the rim by slackening the nuts on the bolts sufficiently to permit contraction of the ring and its removal laterally over the rib 25, the ring and bolts coming away with the rim.

In Figs. 7 and 8 other forms and types of rims are shown, the rim 26 shown in Fig. 7 being of the detachable side ring type, with depressions 27 formed in the bottom wall of the rim to receive the flat heads of the bolts 22 and provide a flush seating surface for a tire mounted on the rim, and the rim 28 shown in Fig. 8 is of the straight-side-split-rim type.

In Fig. 9, a rim 29 is shown having a detachable side ring 30 corresponding to the ring 14 shown in Fig. 3, and this side ring is detachably held in place in a like manner by the same bolts which secure the rim to the seating flange 19.

The specific features of invention included in the constructions illustrated in Figs. 6 to 9 inclusive form the subject-matter of an application for Letters Patent of the United States which is a division of the present application, said application having been filed on the 19th day of April, 1930, and serially numbered 446,475.

In Figs. 10 and 11 a modified construction is shown wherein the use of the split ring 11 is dispensed with and the nuts 31 on the bolts 10 seat directly upon the supporting flange 4 which flange is formed with the slots 6 through which the bolts pass. To prevent the bolts from moving along these slots and thus firmly hold the rim or rims 34 in position, a cupped seat or recess 32 for each nut is formed in the inner face of the supporting flange 4, into which cup or recess, a rounded inner end portion 33 on the nut engages and seats firmly therein. These rims 34 are similar to the rims 8 except that the ribs 9 are dispensed with and the edge portion of the rim thickened to provide a seating portion 35 to seat on the supporting flange 4 and through openings in which portion the bolts 10 extend, said bolts also serving to secure the side ring 36 in place. In this construction it is only necessary to loosen the nuts 31 in order to demount the rims, the bolts being thus free to pass laterally out of the slots with the rims. The head of the bolt 10 is sunk into the ring 36 and so shaped that it conforms to the contour of the ring 36, which in turn conforms to the wall of the tire where the tire contacts with the ring and the bolt head. The arrangement is such that the inflated tire holds the bolt head down hard against the ring 36 and since the bolt 10 is a snug fit in both the ring 36 and the rim 34—35, the ring 36 remains immovable against the lateral pressure exerted by the inflated tire. This interlocking is so secure that the nuts 31 are not necessary to hold the structure together when a rim with an inflated tire is carried as a spare. When the tire is deflated, the casing of the tire can be pushed aside until the bolt heads are clear, whereupon the bolts 10 can be withdrawn, thus freeing the ring and tire for removal laterally.

In the construction shown in Fig. 12, the side ring 37 is a split ring and has a longitudinal rib 38 formed on the seating face of the ring to engage a groove 39 formed in the upper face of the rim 40 which rim is otherwise substantially the same as the rim 34. This ring 37 is secured in place and drawn to its seat on the edge portion of the rim, by bolts 41 having screw threaded upper ends to engage screw-threaded bores in the ring, said bolts also having rounded head portions 32 to seat within the recesses or seats formed in the lower face of the supporting flange 4 at the slots 6 therein. With this arrangement, when the bolts are removed or loosened to demount the rim, the inflated tire will hold the ring 37 in place by reason of the engagement of its rib 38 with the groove 39 in the rim.

A rim mounting for vehicle wheels is thus provided wherein the rim or rims may be quickly and easily demounted and a very rigid construction is secured for detachably holding a rim or rims in perfect concentric relation to the wheel axis and the wheel is strengthened and stiffened. Further, the construction provides for lateral adjustment of the rim or rims and a wheel which is comparatively light in weight and cheap to manufacture. The supporting flange 4 not only serves as a very convenient place for mounting the rims, but also serves to strengthen and stiffen the wheel and the fastening bolts which detachably hold the rim, also contact the rim slightly and pull it firmly to its seat upon the flange with a large area of contact between rim and flange, preventing play therebetween and consequent squeaking. The rim and flange by reason of the manner of mounting and securing of the rim, are in effect integral and the securing bolts may also serve to hold the side ring in place.

Obviously, changes may be made in the construction and arrangement of parts, within the scope of the appended claims, without departing from the spirit of the invention and I do not, therefore, wish to limit myself to the particular construction shown.

Having thus fully described my invention, what I claim is:—

1. A wheel including a rim supporting portion, a rim to seat upon said supporting portion, a side ring for retaining a pneumatic tire in place and seated flat upon said rim, and means extending inwardly from said side ring and through said rim and said supporting portion holding said ring in place on said rim and permitting said rim, ring and tire to be detachably attached to said supporting portion while said tire is inflated.

2. A wheel including a rim supporting portion, a rim to seat upon said supporting portion, a side ring for retaining a pneumatic tire in place upon said rim and means extending radially inward through said ring, rim and supporting portion holding said ring in place on said rim and detachably securing said rim to said supporting portion while the said tire is inflated, said means provided with heads that contact with said tire, holding said heads against said ring when said tire is inflated.

3. A wheel including a rim supporting portion, a pneumatic tire carrying rim to seat upon said supporting portion, a tire on said rim, and means extending radially inward through said rim and said supporting portion detachably securing said rim to said supporting portion, said means comprising bolts held in place upon said rim by said tire when laterally spread upon inflation.

4. A wheel including a rim supporting portion, a rim to seat thereon, a side ring for retaining a pneumatic tire in place upon said rim, and means extending inwardly from said ring and through said rim and said supporting portion for securing said ring to said rim and said rim to said supporting portion, said tire spreading over at least part of said means when inflated and holding said ring and means in place and permitting said ring, rim and tire to be detachably attached to said rim supporting portion while said tire is inflated, and permitting removal of said means from said rim only when said tire is deflated.

5. In combination, a wheel provided with a rim receiving portion, a rim seated upon said portion, a removable flange ring seated on said rim, a tire on said rim, and bolts extending through said ring, rim and portion for securing said ring to said rim and said rim to said portion, the heads of said bolts being exposed on the upper surface of said ring and being maintained in position relative thereto when said tire is inflated by the radial component of the sidewall pressure of said tire.

6. In combination, a wheel provided with a rim receiving portion, a rim seated upon said portion, a removable flange ring seated on said rim, a tire on said rim, and bolts extending through said ring, rim and portion for securing said ring to said rim and said rim to said portion, the heads of said bolts being exposed on the upper surface of said ring and being maintained in position relative thereto when said tire is inflated by the radial component of the sidewall pressure of said tire, and said portion being slotted axially of said wheel for reception of said bolts and to permit removal of said rim, ring and tire therefrom while said tire is inflated.

7. In combination, a wheel provided with a rim supporting portion, a rim seating upon said portion, a tire on said rim, a removable flange ring seated upon said rim, and bolts extending through said portion, rim and ring acting to clamp said rim between said ring and portion, said bolts being overlapped by said tire when spread upon inflation whereby to lock them against withdrawal.

8. A wheel rim construction for a pneumatic tire comprising a base adapted to receive said tire provided with an integral marginal flange at one edge thereof and a removable marginal flange at the other edge thereof, and radially movable means extending through said removable flange and said base for holding said removable flange against lateral movement relative to said base, said tire spreading over said means when inflated whereby to hold it against axial displacement, said means also providing means for securing said rim to a wheel.

9. A wheel including a rim supporting portion projecting laterally from the body thereof, the radially inner surface of said supporting portion being provided with a plurality of annular grooves, a tire carrying rim adjustable laterally of the wheel seated upon said supporting portion, a tire retaining ring member seated upon said rim, an expansible annular member located within said supporting portion adapted to engage a selection of said grooves determined by the adjusted position of said rim, and common means including tension elements which extend between said members, drawing said ring against said rim and said expansible member and said rim toward each other clamping said supporting member therebetween detachably securing said rim in adjusted position.

10. In combination, a wheel provided with an annular marginal flange portion, a rim seated on the radially outer surface of said portion, a clamping member seated on the radially inner surface of said portion, a screw member extending through said portion, a nut engageable with said screw member for drawing said clamping member towards said rim to lock said rim to said portion, said flange portion being provided with means rendering said screw member adjustable lat- 11. A wheel including a projecting rim supporting portion, a rim seated thereupon, an expansible member contacting the radially inner surface of said supporting portion and means for drawing said expansible member and said rim towards each other clamping said rim supporting portion therebetween.

12. A wheel including a cylindrical rim supporting portion, a tire carrying rim seated thereupon, an expansible annular member contacting the radially inner surface of said supporting portion and means drawing said expansible member and said rim toward each other detachably clamping said supporting portion therebetween.

13. A wheel including a rim supporting portion projecting laterally from the body thereof, the radially inner surface of said supporting portion being provided with annular grooves, an expansible annular member located within said supporting portion engaging said grooves, a rim seated upon said supporting member and means drawing said expansible member and said rim toward each other detachably clamping said supporting member therebetween.

14. A wheel including a rim supporting portion projecting laterally from the body thereof, the radially inner surface of said supporting portion being provided with a plurality of annular grooves, a tire carrying rim adjustable laterally of the wheel seated upon said supporting portion, an expansible annular member located within said supporting portion adapted to engage a selection of said grooves determined by the adjusted position of said rim and means drawing said expansible member and said rim toward each other clamping said supporting member therebetween detachably securing said rim in adjusted position.

15. A wheel including a rim supporting portion projecting laterally from the body thereof, a rim seated upon said supporting portion, an expansible annular member located within said supporting portion and contacting therewith, said expansible member and said portion being provided with means preventing lateral movement of said member, and means drawing said expansible member and said rim toward each other clamping said supporting portion therebetween detachably securing said rim to said wheel.

16. In combination, a wheel provided with an annular marginal flange portion providing a rim seat, a rim received on said seat, a clamping member contacting against the radially inner surface of said flange portion, means extending through said flange portion for drawing said member towards said rim whereby to clamp said flange portion between said member and said rim, and circumferentially extending strengthening means extending radially inward from said flange portion co-operating with said member to prevent lateral displacement thereof.

17. In combination, a wheel provided with an annular marginal flange portion providing a rim seat, a rim received on said seat, a clamping member contacting against the radially inner surface of said flange portion, means extending through said flange portion for drawing said member towards said rim whereby to clamp said flange portion between said member and said rim, and means on said flange portion co-operating with said member to prevent lateral displacement thereof, the last mentioned means comprising a circumferential inwardly extending bead on the radially inner surface of said flange portion.

18. In combination, a wheel provided with an annular marginal flange portion, a rim seated upon the radially outer surface of said portion, the radially inner surface of said portion being provided with an inwardly extending circumferential flange, an expansible ring-like clamping member seated against the inner surface of said portion and bearing against said inwardly extending flange for limiting its movement in one direction axially of said wheel, and means extending radially of said wheel acting to draw said rim and said clamping member toward each other.

19. In combination, a wheel including an annular rim supporting portion the radially inner surface of which is provided with spaced annular grooves, said portion being provided with an axially extending slot leading into said grooves, a rim seated upon said portion, a radially movable clamping member variously receivable in said grooves, and means extending through said slot acting to draw said clamping member toward said rim.

20. In combination, a wheel provided with a cylindrical rim supporting portion, the radially inner surface of which is provided with a plurality of axially spaced annular grooves, said portion being also provided with an axially extending slot therein, a rim seated on said portion, a clamping member on said inner surface, and screw means passing through said slot extending between said rim and clamping member for clamping said rim against axial movement on said portion, said clamping member being adapted for engagement with any one of said annular grooves whereby to control its axial position on said wheel and thereby control the axial position of said rim on said wheel.

In testimony whereof I affix my signature.

EMIL A. NELSON.